Jan. 1, 1924

H. C. EGERTON

BELT

Filed Oct. 5, 1918

1,479,032

Inventor
Henry C Egerton
By his Attorney
Harry L Duncan

Patented Jan. 1, 1924.

1,479,032

UNITED STATES PATENT OFFICE.

HENRY C. EGERTON, OF RIDGEWOOD, NEW JERSEY.

BELT.

Application filed October 5, 1918. Serial No. 256,969.

*To all whom it may concern:*

Be it known that I, HENRY C. EGERTON, a citizen of the United States, and resident of Ridgewood, county of Bergen, State of New Jersey, have made a certain new and useful Invention Relating to Belts, of which the following is a specification taken in connection with the accompanying drawing.

This invention relates especially to driving and carrier belts in which the body or traction member of the belt comprises strips or tapes of fabric, threads, cords, or other fibrous material containing cured phenolic condensation cementing material so as to greatly increase the strength of the same. Preferably a connector member or layer of fabric is cemented or united to this traction member as by such cementing material and may advantageously be formed with a frictioned or other rubber coating to which a layer of vulcanized rubber is secured so as to be strongly and permanently united to the traction member of the belt and considerably strengthen the same by preventing undesirable bending or cracking thereof. For some purposes driving belts of this construction may advantageously be formed with a wearing surface or layer of vulcanized rubber on the other side of the body or traction member and this is of course advantageous in carrier belts which may be formed with projecting flights, buckets or carrier members cemented or otherwise secured to the belt and formed, if desired, with vulcanized rubber facing or covering portions.

In the accompanying drawing showing in a somewhat diagrammatic way illustrative embodiments of this invention, Fig. 1 is a partial longitudinal section through a carrier belt of this general character, the parts being shown in separated position for greater clearness.

Figure 1:
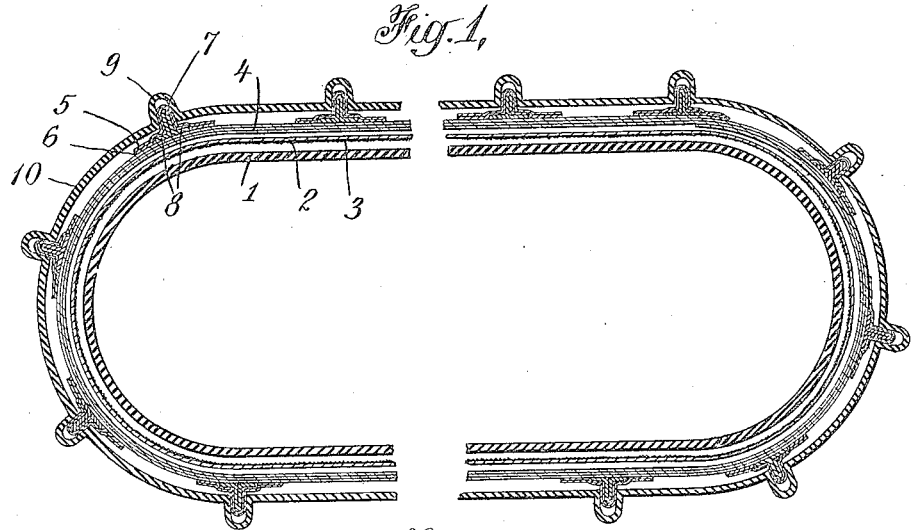
Figure 2:
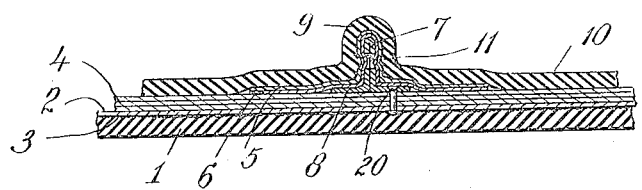
Fig. 2 is an enlarged detail section thereof.

The strength of canvas or other fabric or fibrous material used in making power and other belts can be greatly increased by incorporating therewith a suitable amount of cured phenolic condensation cementing material, such, for instance, as bakelite, condensite or redmanol varnish compositions, by impregnating the canvas with such compositions as bakelite varnish No. 1, for example, and drying and heat curing under pressure, so that the cured impregnated fabric contains thirty to forty per cent more or less, by weight, of the cementing material. The cured phenolic condensation cementing material seems to quite thoroughly impregnate the threads and fibres of the fabric and greatly increase the tensile strength thereof, so that where the number of layers of fabric in the belt body or traction member is not excessive, and allows the bending around the pulleys used, a very strong and light belt body is thus secured. It is of course understood that it is generally undesirable to use an excessive quantity of phenolic condensation cementing material beyond what can be properly absorbed by the fibres or threads of the fabric, unless, of course, some special softening agents are incorporated in the phenolic condensation cementing material, such as suitable waxy, oily or other components, for instance, castor oil, which may be present to the extent of five to fifteen per cent more or less of the cured cementing material in some cases, although considerably reducing the strength thereof. By thoroughly and securely uniting a gripping and strengthening layer of vulcanized rubber to such a traction member, its frictional grip on the pulley faces is greatly increased and the elastic resistance of the rubber also exerts a highly desirable strengthening action on the cured impregnated fabric by minimizing or preventing cracking and breaking when bending occurs. Indeed, the rubber seems to make possible a much greater extent of bending without injury than is possible with a similar multiple layer piece of canvas impregnated with regular cured bakelite varnish, for instance. As indicated in Figs. 1 and 2 the belt body or traction member 4 may be in the form of a number of layers of canvas impregnated with or carrying phenolic condensation cementing material of this character and it is of course advantageous to use an endless strip or sheet of canvas which may extend a number of times around the belt and thus minimize joints. As indicated this canvas or other fabric makes three complete turns so that this traction member of the belt comprises three thicknesses of such impregnated canvas or fabric at every part. It is desirable to interpose a fabric connector member between the impregnated traction member of the belt and the rubber gripping and strengthening member thereof and this connector member or layer 2 may be formed of relatively thin canvas or other suitable fabric which has preferably been provided with a frictioned or other rubber coating 3 on the face with which the rubber or traction member engages. The other side of this connector member may be forced into engagement with the impregnated fabric constituting the traction member of the belt so as to be securely and thoroughly cemented thereto by the phenolic condensation cementing material during the heat curing and vulcanizing treatment to which the parts are subjected. As indicated a substantially uniform rubber layer or member 1 may be applied to the rubberized surface of the connector member and all of these parts may be forced together during the vulcanizing and curing treatment during which they are held under pressure for an hour more or less while being heated to temperatures of 250° to 320° F. or so to thoroughly vulcanize the rubber composition and cure or solidify the phenolic condensation cementing material and also cement or unite all of the parts together.

When used as a carrier belt an additional wearing surface is preferably provided which may be formed of vulcanized rubber or other suitable material and may, if desired, enclose and protect any projecting flights or ribs which are desired on the outer or carrying surface of the belt. As indicated in Figs. 1 and 2, the carrier flight may comprise a metallic rib or support 7 of any suitable form and construction and may, if desired, be formed with the angular brackets or foot plates 8 which may be secured to the traction member of the belt in any suitable way as by rivets 20 shown, or by one or more layers or thicknesses 5, 6, of canvas or other material impregnated with such cementing material and enclosing the flight rib or support which may have apertured portions 11 to facilitate this uniting action. The carrier wearing surface or member 10 of rubber composition may also extend over this surface of the belt and have portions 9 extending around the carrier flights thereon and may be permanently and securely united thereto during the vulcanizing and curing process described. The heat and pressure of this process seems to soften or melt the phenolic condensation cementing material adjacent the rubber which is forced sufficiently into the pores or interstices of the fabric so as to grippingly engage the same and secure thorough adherence without necessitating in all cases the use of a preliminary frictioned or other rubber coating on the fabric.

Figure 3:
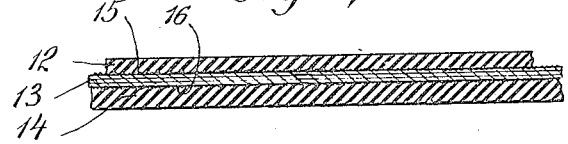
Figs. 3 and 4 are similar detail sections through other belt constructions.
Figure 4:
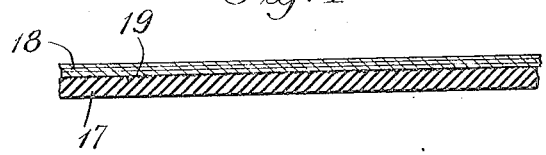

Fig. 3 shows another form of carrier or power belt having a body or traction member 13 formed of a number of layers of canvas or other suitable fabric or fibrous material, such, for instance, as specially woven cloth in which strong cotton warp threads are used together with sufficient transverse filling or connecting threads to preliminarily secure the fabric together. By impregnating such fabric or other fibrous material with phenolic condensation cementing material of this character and preferably applying a frictioned or other rubber coating 15, 16 to one or both sides of the fabric or to additional connector layers applied thereto, rubber strengthening members 12, 14, may be securely united and vulcanized to one or both sides of the traction member so as to increase the life of the belt for power or carrier purposes. Fig. 4 shows a generally similar arrangement in which the traction or body member 18 is formed of a number of layers of suitable fabric or fibrous material to one of which a frictioned or other rubber coating 19 may be applied so as to promote the adherence of the rubber strengthening layer or member 17 when the whole is vulcanized and cured together under the desired heat and pressure.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims.

I claim—

1. The belt comprising a body traction member formed of a number of layers of canvas carrying and thoroughly impregnated with thirty to forty per cent by weight of cured phenolic condensation cementing material, a fabric connector cemented to said traction member, a vulcanized rubber strengthening and gripping member securely united and vulcanized to said connector, flight supports secured to one side of said traction member, and a vulcanized rubber carrier surface permanently secured to said traction member and said flight supports to substantially enclose the same.

2. The belt comprising a body traction member formed of a number of layers of fabric carrying cured phenolic condensation cementing material, a fabric connector cemented to said traction member, a vulcanized rubber strengthening and gripping member securely united to and vulcanized to said connector, flight members secured to one side of said traction member, and a vulcanized rubber carrier surface permanently secured to said traction member and said flight members to substantially enclose the same.

3. The belt comprising a body traction member formed of a number of layers of fabric carrying cured phenolic condensation cementing material, a fabric connector cemented to said traction member, a vulcanized rubber strengthening and gripping member securely united to said connector, and flight members secured to one side of said traction member.

4. The belt comprising a traction member formed of a number of layers of canvas carrying and thoroughly impregnated with thirty to forty per cent by weight of phenolic condensation cementing material comprising softening material, a fabric connector cemented to said traction member and a vulcanized rubber strengthening and gripping member securely united and vulcanized to said connector.

5. The belt comprising a traction member formed of fabric carrying phenolic condensation cementing material comprising softening material, a fabric connector cemented to said traction member and a vulcanized rubber strengthening and gripping member securely united and vulcanized to said connector.

6. The belt comprising a traction member formed of fabric carrying phenolic condensation cementing material comprising softening material, and a vulcanized rubber strengthening member securely united to said traction member.

7. The belt comprising a body traction member formed of a number of layers of fabric carrying and thoroughly impregnated with phenolic condensation cementing material, fabric connector members cemented to said traction member and vulcanized rubber strengthening and gripping members securely united and vulcanized to both sides of said traction member.

8. The belt comprising a body member formed of a number of layers of fabric carrying phenolic condensation cementing material and vulcanized rubber strengthening members securely united and vulcanized to both sides of said traction member.

9. The belt comprising a body member formed of fibrous material carrying phenolic condensation cementing material, and vulcanized rubber strengthening members securely united and vulcanized to both sides of said traction member.

10. The belt comprising a number of layers of fibrous material impregnated with phenolic condensation cementing material, and vulcanized rubber strengthening and gripping members securely united and vulcanized to said fibrous material.

11. The belt comprising fibrous material carrying phenolic condensation cementing material, and a vulcanized rubber member securely united to said fibrous material.

12. The belt comprising a number of layers of fabric carrying and impregnated with thirty to forty per cent by weight of phenolic condensation cementing material and vulcanized rubber strengthening and gripping members securely united to both sides of said fabric.

13. The belt comprising a number of layers of fabric carrying phenolic condensation cementing material and vulcanized rubber strengthening and gripping members securely united to both sides of said fabric.

14. The belt comprising fabric carrying phenolic condensation cementing material and a vulcanized rubber strengthening and gripping member securely united to said fabric.

15. The carrier belt comprising a body traction member formed of a number of layers of canvas fabric carrying phenolic condensation cementing material and connected projecting flight supports comprising fabric and incorporated phenolic condensation cementing material and secured to said traction member and a vulcanized rubber carrier surface permanently secured to said traction member and said flight supports to substantially enclose the same.

16. The carrier belt comprising a body traction member formed of fabric and connected projecting flight supports comprising fabric and incorporated phenolic condensation cementing material and secured to said traction member.

17. The belt comprising a body member comprising fabric and connected projecting flight members comprising fibrous material and incorporated phenolic condensation cementing material.

18. The belt comprising a body member and connected projecting members comprising fibrous material and incorporated phenolic condensation cementing material.

19. The endless belt comprising a thin flexible body traction member formed of a plurality of superimposed layers of fabric connected and strengthened by thirty to forty per cent of incorporated cured phenolic condensation cementing material and a vulcanized rubber facing secured to said traction member.

20. The belt comprising a thin flexible body traction member formed of a plurality of superimposed layers of fabric connected and strengthened by incorporated cured phenolic condensation cementing material and a vulcanized rubber facing secured to said traction member.

21. The flexible endless belt formed of a layer of fibrous material connected and strengthened by thirty to forty per cent of incorporated cured phenolic condensation cementing material.

22. The thin flexible belt comprising a plurality of superimposed layers of fabric connected and strengthened by incorporated cured phenolic condensation cementing material.

23. The belt comprising a thin flexible body formed of a plurality of superimposed layers of fabric connected and strengthened by more than twenty per cent of incorporated cured phenolic condensation cementing material.

HENRY C. EGERTON.